United States Patent
Nogami et al.

(10) Patent No.: US 12,043,551 B2
(45) Date of Patent: Jul. 23, 2024

(54) IONIC CONDUCTOR CONTAINING HIGH-TEMPERATURE PHASE OF $LiCB_9H_{10}$, METHOD FOR MANUFACTURING SAME, AND SOLID ELECTROLYTE FOR ALL-SOLID-STATE BATTERY CONTAINING SAID ION CONDUCTOR

(71) Applicants: MITSUBISHI GAS CHEMICAL COMPANY, INC., Tokyo (JP); TOHOKU TECHNO ARCH CO., LTD., Miyagi (JP)

(72) Inventors: Genki Nogami, Niigata (JP); Keita Noguchi, Niigata (JP); Sangryun Kim, Miyagi (JP); Shin-ichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

( * ) Notice: Subject to any disclaimer, the term of this patent is extended or adjusted under 35 U.S.C. 154(b) by 687 days.

(21) Appl. No.: 17/267,185

(22) PCT Filed: Aug. 16, 2019

(86) PCT No.: PCT/JP2019/032094
§ 371 (c)(1),
(2) Date: Feb. 9, 2021

(87) PCT Pub. No.: WO2020/040044
PCT Pub. Date: Feb. 27, 2020

(65) Prior Publication Data
US 2021/0300773 A1 Sep. 30, 2021

(30) Foreign Application Priority Data
Aug. 23, 2018 (JP) ................. 2018-156211

(51) Int. Cl.
*C01D 15/00* (2006.01)
*B01J 2/00* (2006.01)
(Continued)

(52) U.S. Cl.
CPC ............. *C01D 15/00* (2013.01); *B01J 2/00* (2013.01); *H01M 4/38* (2013.01); *H01M 4/583* (2013.01);
(Continued)

(58) Field of Classification Search
CPC . C01D 15/00; B01J 2/00; H01M 4/38; H01M 4/583; H01M 10/0525;
(Continued)

(56) References Cited

U.S. PATENT DOCUMENTS

| 10,038,192 B2 | 7/2018 | Nogami et al. |
| 2012/0251871 A1 | 10/2012 | Suzuki et al. |

(Continued)

FOREIGN PATENT DOCUMENTS

| JP | 2012-209104 A | 10/2012 |
| JP | 6246816 B2 | 12/2017 |

(Continued)

OTHER PUBLICATIONS

Kim et al.,Complex Hydride Solid Electrolytes of the Li(CB9H10)-Li(CB11H12) Quasi-Binary System: Relationship between the Solid Solution and Phase Transition, and the Electrochemical Properties ,(Year: 2020),Applied Energy Materials 3 (5), 4831-4839.*

(Continued)

*Primary Examiner* — Jonathan G Jelsma
*Assistant Examiner* — Omar M Kekia
(74) *Attorney, Agent, or Firm* — GREENBLUM & BERNSTEIN, P.L.C.

(57) ABSTRACT

A method for manufacturing an ion conductor including $LiCB_9H_{10}$ and $LiCB_{11}H_{12}$ is provided. The method includes
(Continued)

mixing $LiCB_9H_{10}$ and $LiCB_{11}H_{12}$ in a molar ratio of $LiCB_9H_{10}/LiCB_{11}H_{12}=1.1$ to 20. An ion conductor including lithium (Li), carbon (C), boron (B) and hydrogen (H) is also provided. The ion conductor has X-ray diffraction peaks at at least $2\theta=14.9\pm0.3$ deg, $16.4\pm0.3$ deg and $17.1\pm0.5$ deg in X ray diffraction measurement at 25° C., and has an intensity ratio (B/A) of 1.0 to 20 as calculated from A=(X-ray diffraction intensity at $16.4\pm0.3$ deg)−(X-ray diffraction intensity at 20 deg) and B=(X-ray diffraction intensity at $17.1\pm0.5$ deg)−(X-ray diffraction intensity at 20 deg).

10 Claims, 8 Drawing Sheets

(51) Int. Cl.
| | | |
|---|---|---|
| *H01M 4/38* | (2006.01) | |
| *H01M 4/583* | (2010.01) | |
| *H01M 10/0525* | (2010.01) | |
| *H01M 10/0562* | (2010.01) | |
| *H01M 10/44* | (2006.01) | |
| *H01M 4/02* | (2006.01) | |

(52) U.S. Cl.
CPC ... *H01M 10/0525* (2013.01); *H01M 10/0562* (2013.01); *H01M 10/44* (2013.01); *C01P 2002/72* (2013.01); *C01P 2002/82* (2013.01); *C01P 2006/40* (2013.01); *H01M 2004/021* (2013.01); *H01M 2300/0065* (2013.01)

(58) Field of Classification Search
CPC ............. H01M 10/0562; H01M 10/44; H01M 2004/021; H01M 2300/0065; H01M 2300/0068; H01M 4/382; H01M 10/052; H01M 4/0562; C01P 2002/72; C01P 2002/82; C01P 2006/40; C01B 6/21; C01B 6/003; C01B 35/026; Y02E 60/10; H01B 1/06; C01M 2004/021
USPC ........................................................ 429/322
See application file for complete search history.

(56) References Cited

U.S. PATENT DOCUMENTS

| | | |
|---|---|---|
| 2016/0204466 A1 | 7/2016 | Nogami et al. |
| 2016/0372786 A1* | 12/2016 | Udovic, IV ....... H01M 10/0562 |
| 2019/0080814 A1 | 3/2019 | Shimada et al. |
| 2020/0303778 A1 | 9/2020 | Nogami et al. |

FOREIGN PATENT DOCUMENTS

| | | |
|---|---|---|
| JP | 2018-116784 A | 7/2018 |
| WO | 2015/030053 A1 | 3/2015 |
| WO | 2017/126416 A1 | 7/2017 |
| WO | 2019/078130 A1 | 4/2019 |

OTHER PUBLICATIONS

Tang et al., "Stabilizing Superionic-Conducting Structures via Mixed-Anion Solid Solutions of Monocarba-closo-borate Salts", ACS Energy Letters, vol. 1, Sep. 1, 2016, pp. 659-664; cited in ISR.
Yoshida et al., "Development of new solid electrolytes and all-solid-state secondary batteries using hydrides", Materia, vol. 56, No. 7, 2017, pp. 448-452; cited in ISR.
International Search Report issued in International Pat. Appl. No. PCT/JP2019/032094, dated Oct. 8, 2019, along with an English translation thereof.
Written Opinion of the International Searching Authority issued in International Pat. Appl. No. PCT/JP2019/032094, dated Oct. 8, 2019, along with an English translation thereof.

* cited by examiner

[Figure 1A]
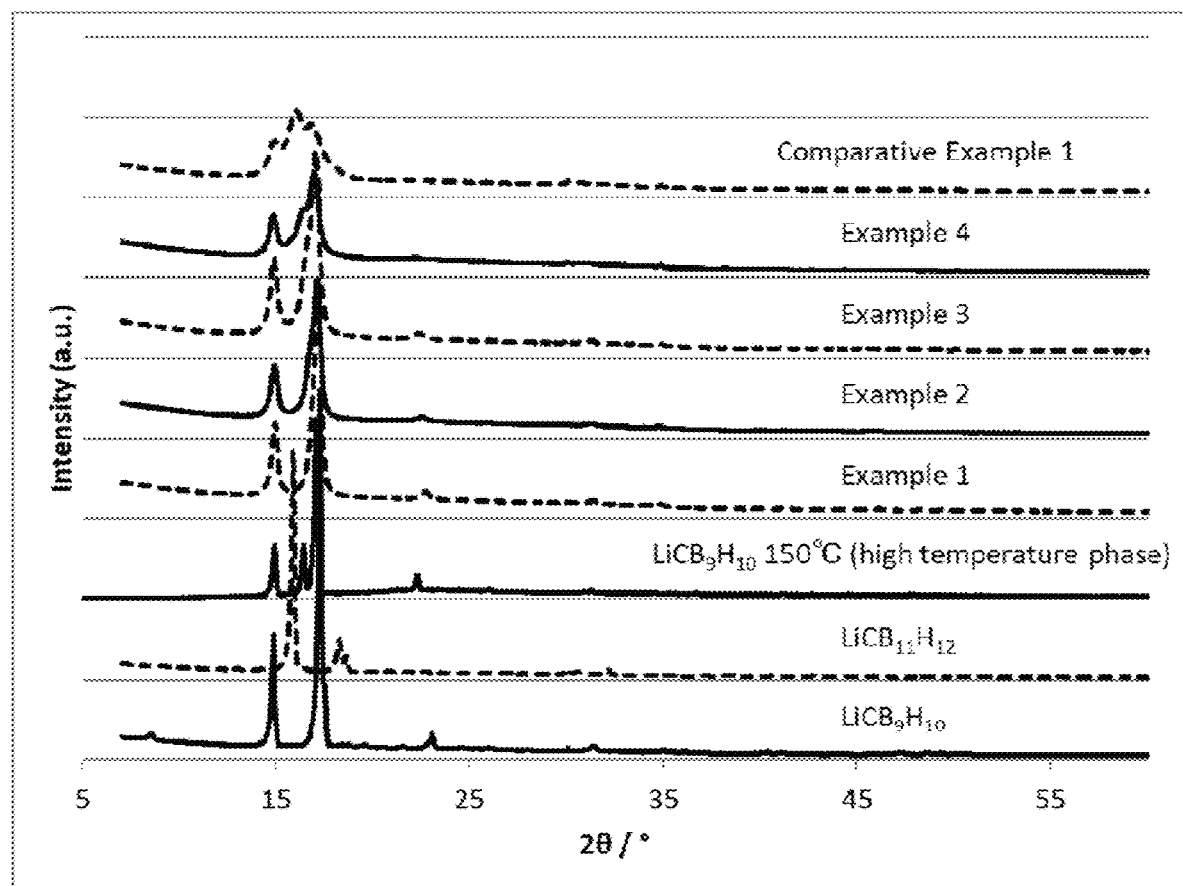

[Figure 1B]
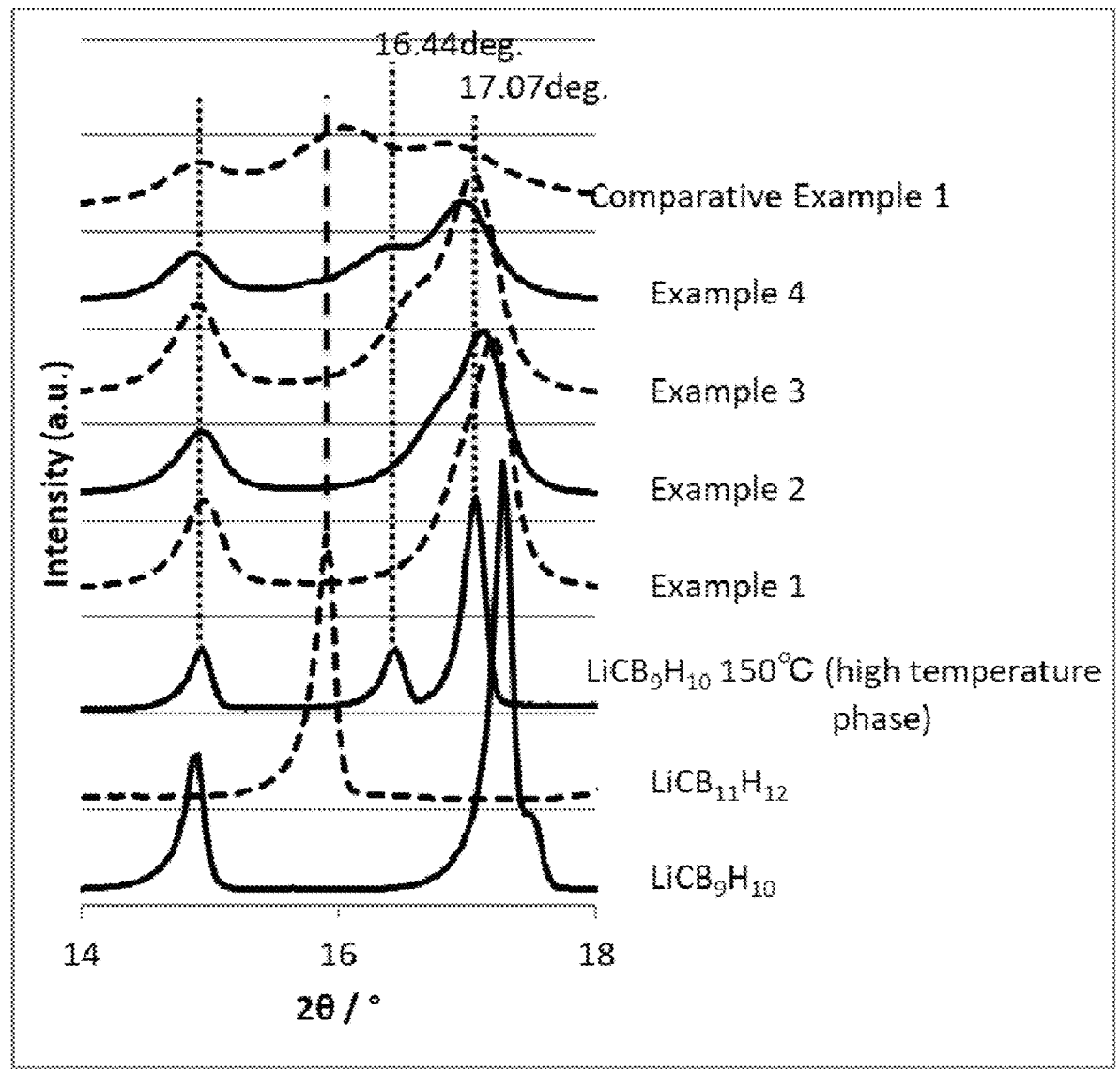

[Figure 2A]
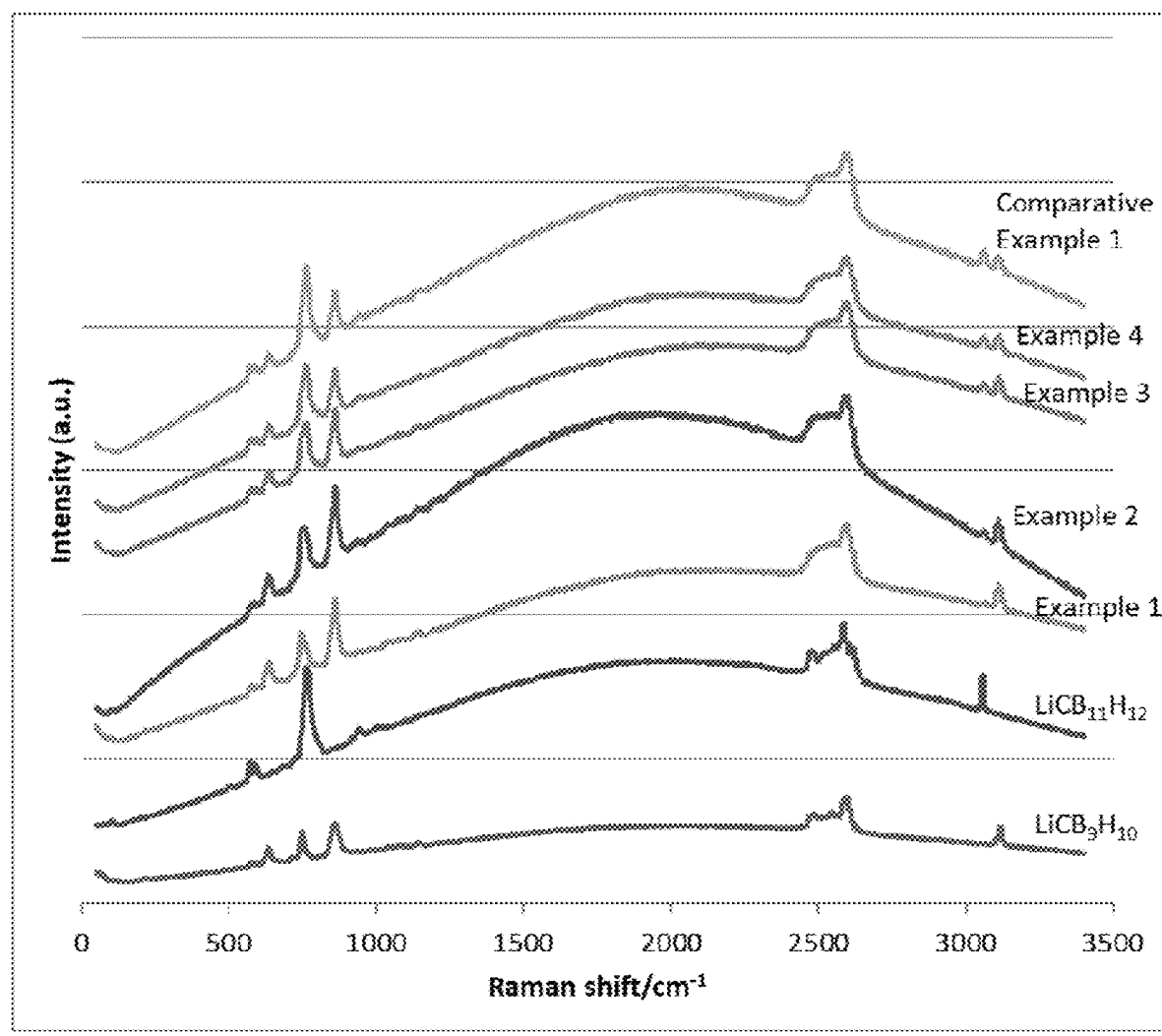

[Figure 2B]
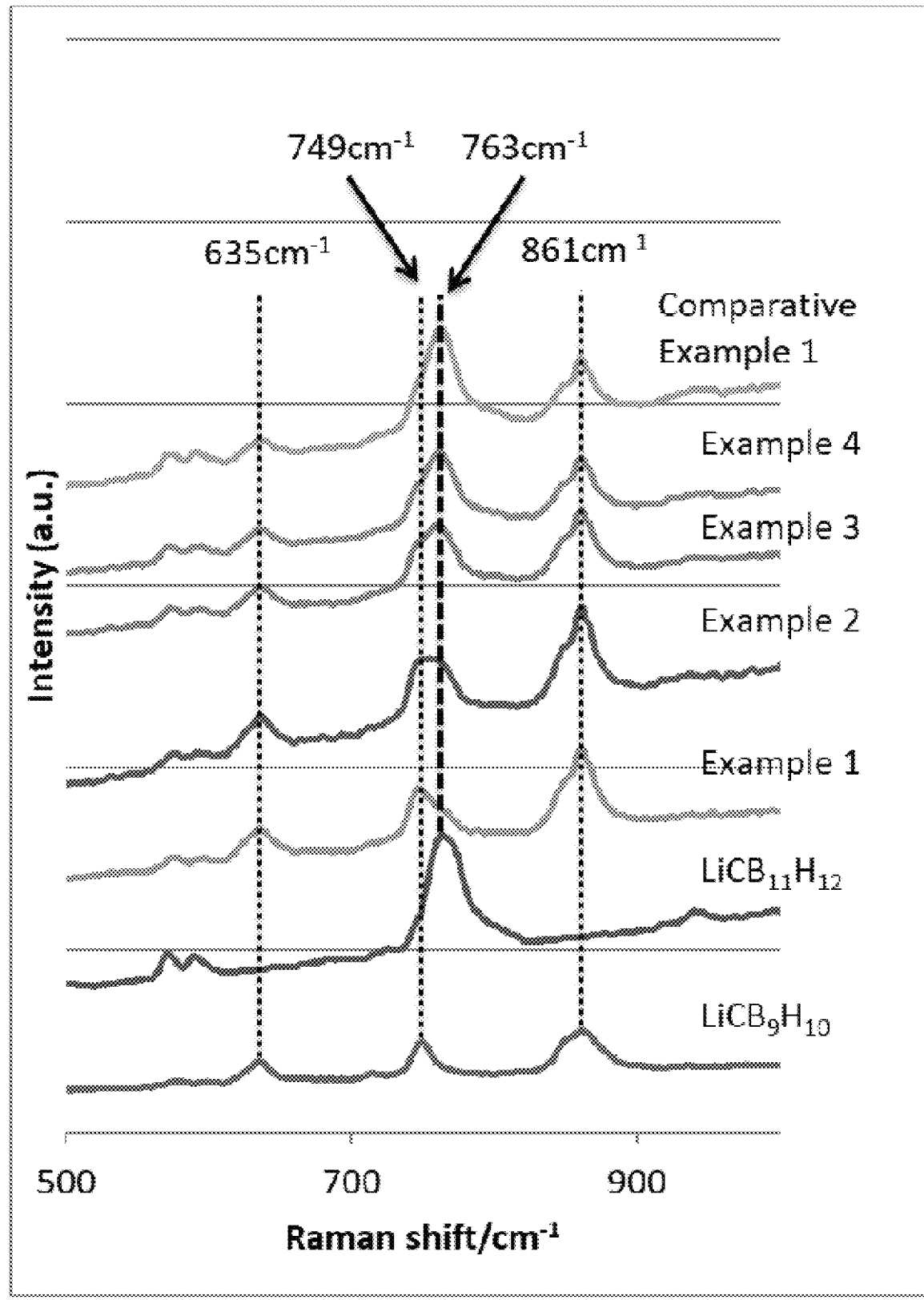

[Figure 3]
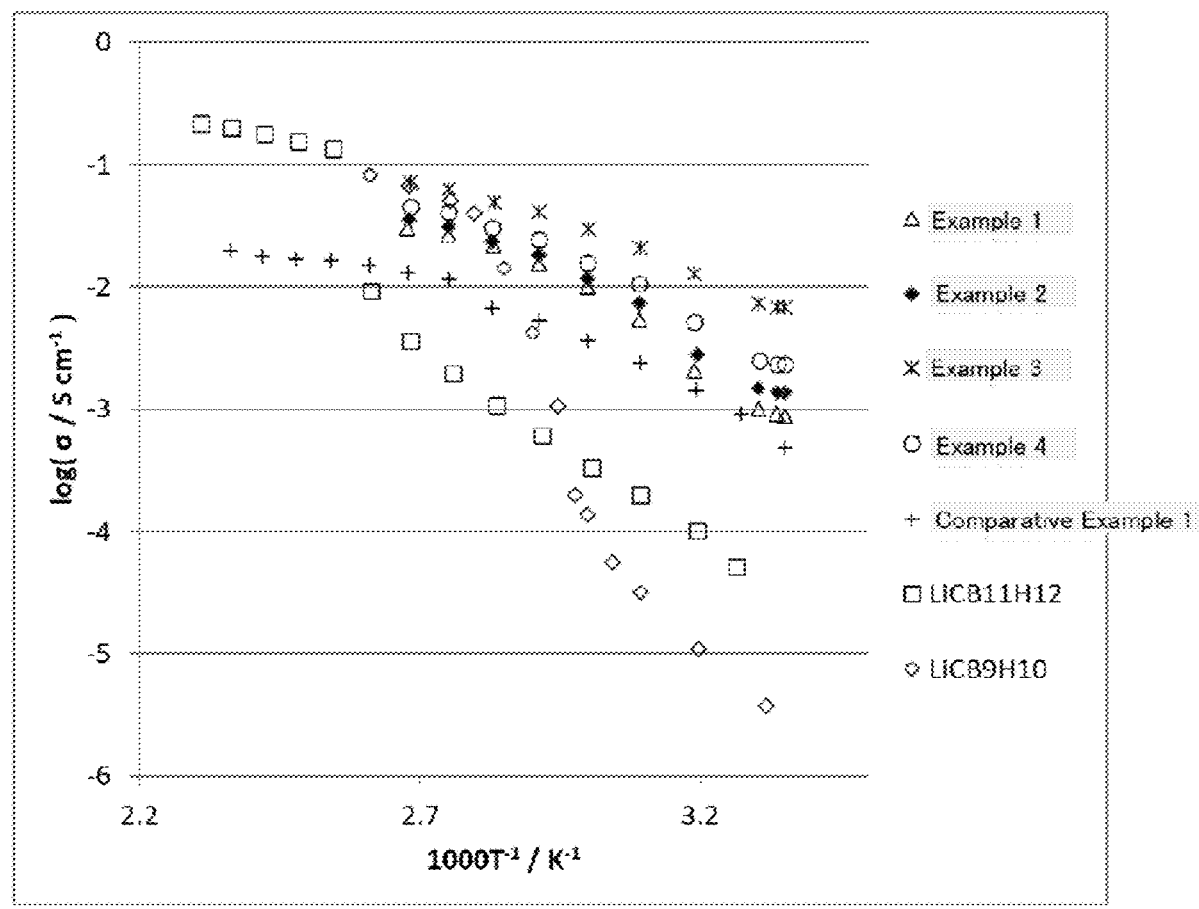

[Figure 4A]
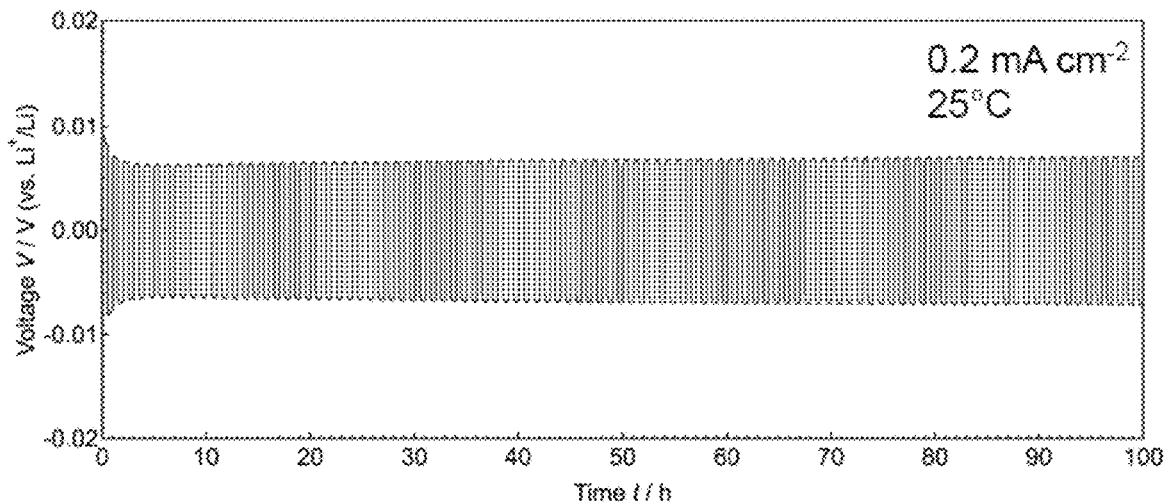
[Figure 4B]
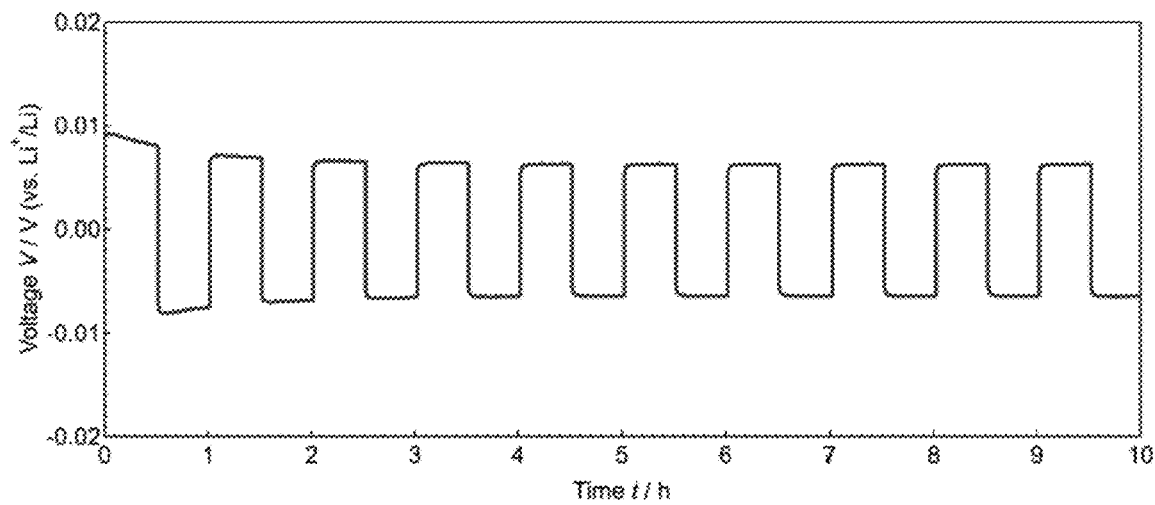

[Figure 5A]
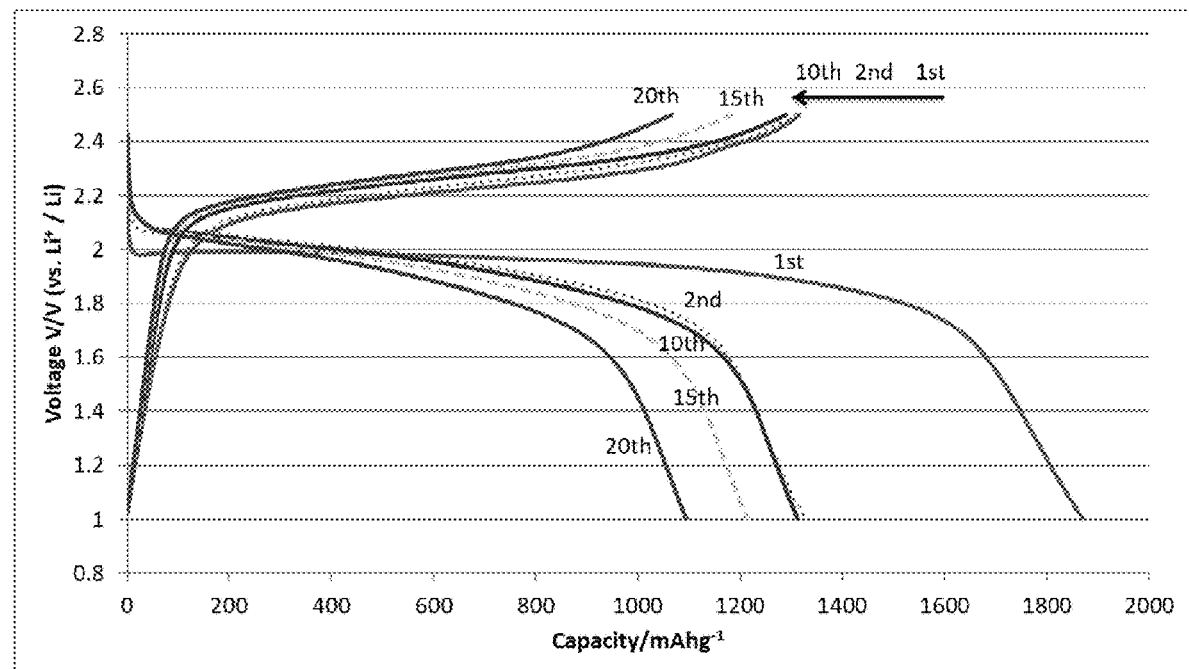

[Figure 5B]
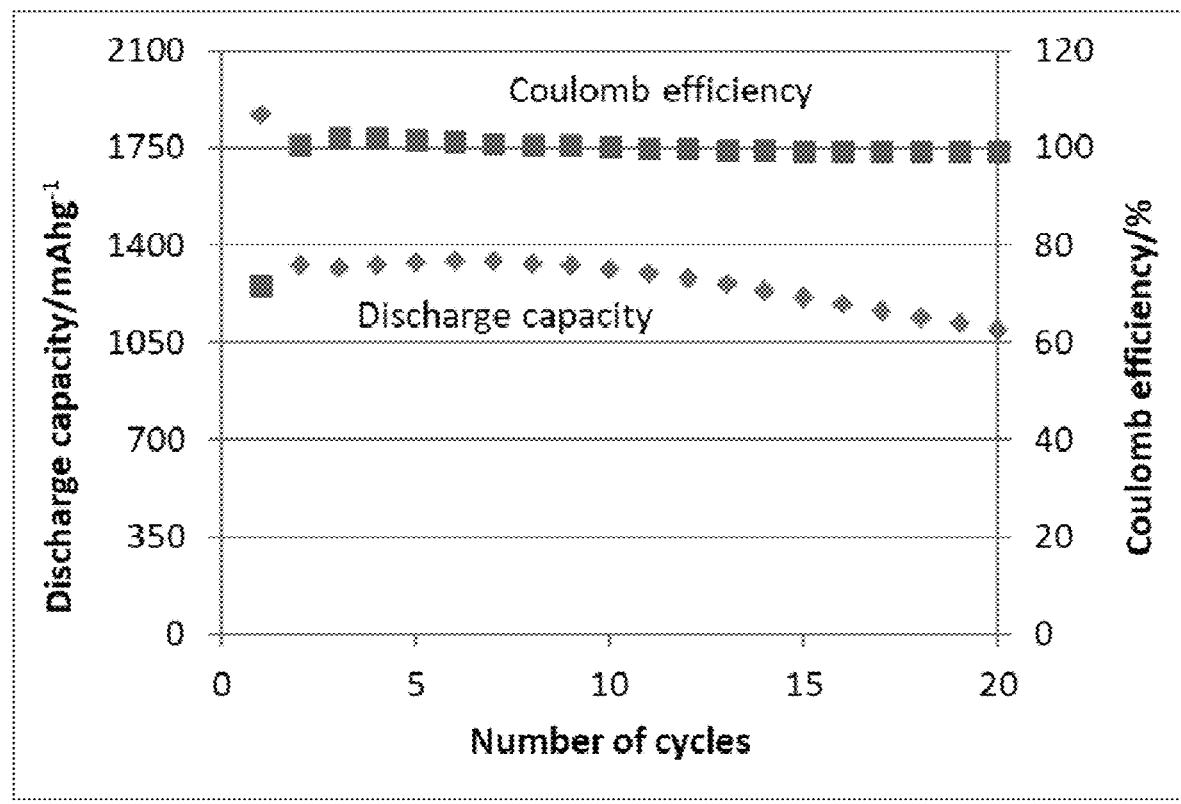

IONIC CONDUCTOR CONTAINING HIGH-TEMPERATURE PHASE OF LiCB$_9$H$_{10}$, METHOD FOR MANUFACTURING SAME, AND SOLID ELECTROLYTE FOR ALL-SOLID-STATE BATTERY CONTAINING SAID ION CONDUCTOR

TECHNICAL FIELD

The present invention relates to an ion conductor containing a high temperature phase of LiCB$_9$H$_{10}$ and a method for manufacturing the same, and a solid electrolyte for an all-solid battery containing the ion conductor.

BACKGROUND ART

In recent years, a need for a lithium ion secondary battery has been increasing in applications such as a portable information terminal, a portable electronic device, an electric automobile, a hybrid electric automobile, and in addition, a stationary power storage system. However, in a current lithium ion secondary battery, a flammable organic solvent is used as an electrolytic solution, and a robust outer packaging is required so that the organic solvent does not leak. Furthermore, a structure of a device is also restricted, for example, in a portable personal computer, etc., the structure which prepares for the risk of leakage of an electrolytic solution in the worst case is required.

Furthermore, the application of a lithium ion secondary battery is extended to moving bodies such as an automobile and an airplane, and thus a large capacity is required in a stationary lithium ion secondary battery. In situations such as these, the importance tends to be placed on safety more than before, and thus effort is put into development of an all-solid lithium ion secondary battery which does not use a harmful material such as an organic solvent.

For example, use of an oxide, a phosphate compound, an organic polymer, a sulfide, a complex hydride, etc. as a solid electrolyte in an all-solid lithium ion secondary battery has been considered.

All-solid batteries are broadly classified into a thin-film type and a bulk type. In the thin-film type, though interface bonding is ideally formed by means of vapor phase film deposition, an electrode layer has a thickness of as thin as several μm and has small electrode surface area, which results in low energy stored per cell and also high cost. Therefore, a thin film type all-solid battery is not suitable for a battery for a large electric storage device and an electric automobile which need to store a large amount of energy. On the other hand, an electrode layer of a balk type battery may have a thickness of several tens of μm to 100 μm, and thus an all-solid battery having a high energy density can be produced.

Among solid electrolytes, sulfides and complex hydrides have high ion conductivity and are relatively soft, and thus they have characteristics that they easily form a solid-solid interface, and the consideration of application thereof to a bulk type all-solid battery is in progress (Patent Documents 1 and 2).

However, a conventional sulfide solid electrolyte has the property of reacting with water, and has the following problems: a sulfide generates hydrogen sulfide; and the ion conductivity decreases after reaction with water. On the other hand, a complex hydride solid electrolyte tends to have a slightly lower ion conductivity compared to that of a sulfide solid electrolyte, and thus enhancement of the ion conductivity is desired.

Patent Document 3 describes a solid electrolyte referred to as carborane-based, but does not describe the ion conductivity.

PRIOR ART DOCUMENTS

Patent Documents

Patent Document 1: Japanese Patent No. 6246816
Patent Document 2: WO 2017-126416
Patent Document 3: US 2016/0372786A1

SUMMARY OF THE INVENTION

Problems to be Solved by the Invention

The object of the present invention is to provide an ion conductor having various excellent properties such as ion conductivity and a method for manufacturing the same, and a solid electrolyte for an all-solid battery containing the ion conductor.

Means for Solving the Problems

The present inventors engaged in diligent study to solve the above problems, and consequently found that the above problems can be solved by the ion conductor obtained by mixing LiCB$_9$H$_{10}$ and LiCB$_{11}$H$_{12}$ in a specific molar ratio. Specifically, the present invention is as follows.

<1> A method for manufacturing an ion conductor comprising LiCB$_9$H$_{10}$ and LiCB$_{11}$H$_{12}$, comprising
a step of mixing LiCB$_9$H$_{10}$ and LiCB$_{11}$H$_{12}$ in a molar ratio of LiCB$_9$H$_{10}$/LiCB$_{11}$H$_{12}$=1.1 to 20.

<2> The method for manufacturing an ion conductor according to the above <1>, wherein the mixing is conducted by mechanical milling treatment.

<3> The method for manufacturing an ion conductor according to the above <2>, wherein a period of time for conducting the mechanical milling treatment is 1 to 48 hours.

<4> The method for manufacturing an ion conductor according to any one of the above <1> to <3>, wherein the obtained ion conductor has X-ray diffraction peaks at at least 2θ=14.9±0.3 deg, 16.4±0.3 deg and 17.1±0.5 deg in X ray diffraction measurement at 25° C., and has an intensity ratio (B/A) of 1.0 to 20 as calculated from A=(X-ray diffraction intensity at 16.4±0.3 deg)−(X-ray diffraction intensity at 20 deg) and B=(X-ray diffraction intensity at 17.1±0.5 deg)−(X-ray diffraction intensity at 20 deg).

<5> An ion conductor comprising lithium (Li), carbon (C), boron (B) and hydrogen (H), wherein the ion conductor has X-ray diffraction peaks at at least 2θ=14.9±0.3 deg, 16.4±0.3 deg and 17.1±0.5 deg in X ray diffraction measurement at 25° C., and has an intensity ratio (B/A) of 1.0 to 20 as calculated from A=(X-ray diffraction intensity at 16.4±0.3 deg)−(X-ray diffraction intensity at 20 deg) and B=(X-ray diffraction intensity at 17.1±0.5 deg)−(X-ray diffraction intensity at 20 deg).

<6> The ion conductor according to the above <5>, wherein the ion conductor comprises LiCB$_9$H$_{10}$.

<7> The ion conductor according to the above <6>, wherein the ion conductor further comprises LiCB$_{11}$H$_{12}$.

<8 The ion conductor according to any one of the above <5> to <7>, wherein the ion conductor has peaks at 749 cm$^{-1}$ (+5 cm 1) and 763 cm$^{-1}$ (+5 cm$^{-1}$) respectively in Raman spectroscopy.

<9> The ion conductor according to any one of the above <5> to <8>, wherein the ion conductor has an ion conductivity of 1.0 to 10 mScm$^{-1}$ at 25° C.

<10> A solid electrolyte for an all-solid battery, comprising the ion conductor according to any one of the above <5> to <9>.

<11> An electrode formed by contacting the solid electrolyte according to the above <10> with metallic lithium.

<12> An all-solid battery comprising the electrode according to the above <11>.

Advantageous Effect of the Invention

According to the present invention, it is possible to provide an ion conductor having various excellent properties such as ion conductivity and a method for manufacturing the same, and a solid electrolyte for an all-solid battery containing the ion conductor.

BRIEF DESCRIPTION OF DRAWINGS

FIG. 1A shows X-ray diffraction peaks for the powders of the ion conductors obtained in Examples 1 to 4 and Comparative Example 1.

FIG. 1B is an enlarged view of a part of X-ray diffraction spectra of FIG. 1A.

FIG. 2A shows Raman spectra for the ion conductors obtained in Examples 1 to 4 and Comparative Example 1.

FIG. 2B is an enlarged view of a part of Raman spectra of FIG. 2A.

FIG. 3 shows measurement results of ion conductivities for the ion conductors obtained in Examples 1 to 4 and Comparative Example 1.

FIG. 4A shows a result of measurement of the voltage applied between the electrodes of the evaluation cell in Example 5.

FIG. 4B is an enlarged view of FIG. 4A.

FIG. 5A shows results of charge/discharge tests in Example 6.

FIG. 5B shows results of charge/discharge tests in Example 6.

EMBODIMENTS FOR CARRYING OUT THE INVENTION

Hereinafter, the embodiments of the present invention will be described. The materials, configuration, etc. described below do not limit the present invention, and can be modified in various ways within the range of the meanings of the present invention.

1. Ion Conductor

According to one embodiment of the present invention, an ion conductor containing lithium (Li), carbon (C), boron (B) and hydrogen (H) is provided. The above embodiment preferably contains a high temperature phase (high ion conductive phase) of $LiCB_9H_{10}$ as a crystal, and more preferably contains $LiCB_9H_{10}$ and $LiCB_{11}H_{12}$.

The ion conductor of the present invention preferably has peaks at 749 cm$^{-1}$ (+5 cm$^{-1}$) based on $LiCB_9H_{10}$ and at 763 cm$^{-1}$ (+5 cm$^{-1}$) based on $LiCB_{11}H_{12}$ respectively in Raman spectroscopy. It may have peaks in other regions, but the above peaks show respective characteristics.

The ion conductor of the present invention preferably contains a high temperature phase of $LiCB_9H_{10}$ as a crystal. $LiCB_9H_{10}$ has a high temperature phase and a low temperature phase on the basis of the state of the crystal, and though a high temperature phase at high temperature (for example, around 75 to 150° C.) has high ion conductivity, it turns to a low temperature phase at around room temperature (for example, about 20 to 65° C.) and has reduced ion conductivity.

The ion conductor of the present invention has X-ray diffraction peaks based on the high temperature phase of $LiCB_9H_{10}$ at at least 2θ=14.9±0.3 deg, 16.4±0.3 deg and 17.1±0.5 deg in X-ray diffraction measurement at 25° C. The intensity ratio (B/A) calculated from A=(X-ray diffraction intensity at 16.4±0.3 deg)−(X-ray diffraction intensity at 20 deg) and B=(X-ray diffraction intensity at 17.1±0.5 deg)−(X-ray diffraction intensity at 20 deg) is preferably within a range of 1.0 to 20, more preferably within a range of 1.0 to 15, and particularly preferably within a range of 1.0 to 10. When the intensity ratio (B/A) is within a range of 1.0 to 20, $LiCB_{11}H_{12}$ is solid-soluted in a high temperature phase of $LiCB_9H_{10}$, which results in decrease in the phase transition temperature, and thus the state of high ion conductivity can be maintained even at around room temperature. This solid solution is achieved when the molar ratio is $LiCB_9H_{10}/LiCB_{11}H_{12}$=1.1 or more. Preferably $LiCB_9H_{10}/LiCB_{11}H_{12}$=1.1 to 20, more preferably $LiCB_9H_{10}/LiCB_{11}H_{12}$=1.25 to 10, and particularly preferably $LiCB_9H_{10}/LiCB_{11}H_{12}$=1.5 to 9, and a high ion conductivity value is obtained when the ratio is within these ranges.

Furthermore, even when the ion conductor of the present invention has an X-ray diffraction peak other than the above peaks, the desired effect can be obtained.

The ion conductor of the present invention may contain a component other than lithium (Li), carbon (C), boron (B) and hydrogen (H). As other components, for example, oxygen (O), nitrogen (N), sulfur (S), fluorine (F), chlorine (Cl), bromine (Br), iodine (I), silicon (Si), germanium (Ge), phosphorus (P), an alkali metal, an alkali earth metal, etc. are included.

The above ion conductor is soft, and can be formed into an electrode layer and a solid electrolyte layer by cold press. The thus formed electrode layer and the solid electrolyte layer have more excellent strength compared to the case where a sulfide solid electrolyte and an oxide solid electrolyte are contained in a large amount. Therefore, an electrode layer and a solid electrolyte layer having good formability and being hardly broken (hardly generating a crack) can be produced by using the ion conductor of the present invention. Furthermore, since the ion conductor of the present invention has low density, a relatively lightweight electrode layer and solid electrolyte layer can be produced. This is therefore preferable since the weight of a whole battery can be reduced. Furthermore, when the ion conductor of the present invention is used for a solid electrolyte layer, the interface resistance between the solid electrolyte layer and an electrode layer can be reduced.

Furthermore, the above ion conductor does not decompose even when it contacts with water or oxygen, and does not generate a harmful toxic gas.

The ion conductivity at 25° C. of the ion conductor of the present invention is preferably 1.0 to 10 mScm$^{-1}$, and more preferably 2.0 to 10 mScm$^{-1}$.

2. Method for Manufacturing Ion Conductor

According to another embodiment of the present invention, a method for manufacturing an ion conductor containing $LiCB_9H_{10}$ and $LiCB_{11}H_{12}$ is provided, which comprises a step of mixing $LiCB_9H_{10}$ and $LiCB_{11}H_{12}$ in molar ratio of $LiCB_9H_{10}/LiCB_{11}H_{12}$=1.1 to 20.

As raw materials $LiCB_9H_{10}$ and $LiCB_{11}H_{12}$, those which are usually commercially available can be used. The purities of those are preferably 95% or more, and more preferably 98% or more. When a compound having purity within the above range is used, a desired crystal is likely to be obtained.

The mixing ratio of $LiCB_9H_{10}$ and $LiCB_{11}H_{12}$ needs to be a molar ratio of $LiCB_9H_{10}/LiCB_{11}H_{12}=1.1$ or more. Preferable is $LiCB_9H_{10}/LiCB_{11}H_{12}=1.1$ to 20, more preferable is $LiCB_9H_{10}/LiCB_{11}H_{12}=1.25$ to 10, and particularly preferable is $LiCB_9H_{10}/LiCB_{11}H_{12}=1.5$ to 9. As described above, particularly high ion conductivity value is obtained when the ratio is within these ranges.

Mixing of $LiCB_9H_{10}$ and $LiCB_{11}H_{12}$ is preferably conducted under an inert gas atmosphere. As an inert gas, for example, helium, nitrogen, argon, etc. can be included, but argon is preferable. The concentrations of moisture and oxygen in the inert gas are preferably controlled at low level, and more preferably, the concentrations of moisture and oxygen in the inert gas are less than 1 ppm.

A method of mixing is not particularly limited, but stirring-mixing in a solvent can be used. Mechanical mixing can be also used, and for example, a method using a mortar machine, a ball mill, a planetary ball mill, a beads mill, a rotating/revolving mixer, a mixing apparatus of high-speed stirring type, a tumbler mixer, etc. can be included. Among these, a planetary ball mill is more preferable, which has excellent crushing capability and mixing capability, and particularly preferably mixing is conducted by mechanical milling treatment using a planetary ball mill. Mechanical mixing is preferably conducted in a dry condition, but can be also conducted in the presence of a solvent. Regardless of the above means, a solvent is not particularly limited, but a nitrile-based solvent such as acetonitrile, an ether-based solvent such as tetrahydrofuran and diethyl ether, N,N-dimethylformamide, N,N-dimethylacetamide, and an alcohol-based solvent such as methanol and ethanol can be included.

The mixing time varies depending on the mixing method, but in the case of stirring-mixing in a solvent, it is, for example, 1 to 48 hours, and preferably 5 to 24 hours. When a solvent is used, the mixing time can be reduced. The mixing time in mechanical mixing is, for example, in the case of using a planetary ball mill, 1 to 24 hours, and preferably 5 to 20 hours.

The reaction pressure is usually within a range of 0.1 Pa to 2 MPa as absolute pressure. Preferably it is 101 kPa to 1 MPa.

The ion conductor obtained by the above manufacturing method of the present invention preferably has peaks at 749 $cm^{-1}$ ($\pm 5$ $cm^{-1}$) based on $LiCB_9H_{10}$ and at 763 $cm^{-1}$ ($\pm 5$ $cm^{-1}$) based on $LiCB_{11}H_{12}$ respectively in Raman spectroscopy. It has X-ray diffraction peaks based on the high temperature phase of $LiCB_9H_{10}$ at at least $2\theta=14.9\pm0.3$ deg, $16.4\pm0.3$ deg and $17.1\pm0.5$ deg in X-ray diffraction measurement at 25° C., and the intensity ratio (B/A) calculated from A=(X-ray diffraction intensity at $16.4\pm0.3$ deg)−(X-ray diffraction intensity at 20 deg) and B=(X-ray diffraction intensity at $17.1\pm0.5$ deg)−(X-ray diffraction intensity at 20 deg) is preferably within a range of 1 to 20, more preferably within a range of 1.0 to 15, and particularly preferably within a range of 1.0 to 10.

3. All-Solid Battery

The ion conductor of the present invention can be used as a solid electrolyte for an all-solid battery. Therefore, according to one embodiment of the present invention, a solid electrolyte for an all-solid battery comprising the above-described ion conductor is provided. According to a further embodiment of the present invention, an all-solid battery using the above-described solid electrolyte for an all-solid battery is provided.

As used herein, an all-solid battery refers to an all-solid battery in which a lithium ion plays a roll of electric conduction, and in particularly refers to an all-solid lithium ion secondary battery. An all-solid battery has a structure in which a solid electrolyte layer is disposed between a positive electrode layer and a negative electrode layer. The ion conductor of the present invention may be contained as a solid electrolyte in any one or more of a positive electrode layer, a negative electrode layer and a solid electrolyte layer. When it is used for an electrode layer, it is more preferably used for a positive electrode layer than for a negative electrode layer. The reason is because a positive electrode layer less causes a side reaction. When the ion conductor of the present invention is contained in a positive electrode layer or a negative electrode layer, the ion conductor and a known positive electrode active material or negative electrode active material for a lithium ion secondary battery are used in combination. As a positive electrode layer, a bulk type electrode layer having an active material and a solid electrolyte in a mixed form is preferably used since it provides a larger capacity per unit cell.

An all-solid battery is produced by forming and laminating each of the layers described above, but a method of forming and laminating each of the layers is not particularly limited. For example, a method in which a solid electrolyte and/or an electrode active material are dispersed in a solvent to form a slurry, which is applied by a doctor blade, spin coating, etc. and the applied slurry is rolled to form a film; gas phase method in which film formation and lamination are conducted using vacuum vapor deposition method, ion plating method, sputtering method, laser abrasion method, etc.; and press method in which a powder is compacted by hot press or cold press without heating, and the compacted product is laminated, are included. The ion conductor of the present invention is relatively soft, and thus it is particularly preferably formed by pressing and laminated to produce a battery. Furthermore, a solid electrolyte can be incorporated in an electrode layer by previously forming an electrode layer having an active material, a conductive assistant and a binder, into which pouring a solution having a solid electrolyte dissolved in a solvent or a slurry having a solid electrolyte dispersed in a solvent, and then removing the solvent.

The atmosphere for producing an all-solid battery is preferably in an inert gas having controlled moisture or in a dry room. Moisture is controlled within a dew point range of −10° ° C. to −100° ° C., more preferably within a dew point range of −20° ° C. to −80° C., and particularly preferably within a dew point range of −30° ° C. to −75° ° C. This is because reduction of ion conductivity due to formation of a hydrate is prevented though the speed of hydrolysis of the ion conductor of the present invention is extremely low.

EXAMPLES

Hereinafter, the present invention will be described in detail with reference to Examples, but the contents of the present invention are not limited thereby.

<Preparation of Ion Conductor>

Example 1

In a glove box under an argon atmosphere, $LiCB_9H_{10}$ (manufactured by Katchem Ltd.) and $LiCB_{11}H_{12}$ (manufactured by Katchem Ltd.) were weighed in the amount of 100 mg so that a molar ratio of $LiCB_9H_{10}:LiCB_{11}H_{12}=9:1$ was obtained, and pre-mixed by an agate mortar. Next, the pre-mixed raw material was placed in a 45 mL pot made of SUJ-2, and in addition, balls made of SUJ-2 (ϕ 7 mm, 20 balls) were placed, and the pot was completely sealed. This pot was attached to a planetary ball mill (P7 manufactured by FRITSCH GmbH), and mechanical milling treatment was conducted at rotation number of 400 rpm for 20 hours to obtain the ion conductor. As a result of X-ray diffraction, the obtained ion conductor contained the high temperature phase of $LiCB_9H_{10}$.

Example 2

The ion conductor was manufactured in the similar way to Example 1 except that the mixing ratio of $LiCB_9H_{10}$ to $LiCB_{11}H_{12}$ by molar ratio was changed to $LiCB_9H_{10}$:$LiCB_{11}H_{12}$=8:2.

Example 3

The ion conductor was manufactured in the similar way to Example 1 except that the mixing ratio of $LiCB_9H_{10}$ to $LiCB_{11}H_{12}$ by molar ratio was changed to $LiCB_9H_{10}$:$LiCB_{11}H_{12}$=7:3.

Example 4

The ion conductor was manufactured in the similar way to Example 1 except that the mixing ratio of $LiCB_9H_{10}$ to $LiCB_{11}H_{12}$ by molar ratio was changed to $LiCB_9H_{10}$:$LiCB_{11}H_{12}$=6:4.

Comparative Example 1

The ion conductor was manufactured in the similar way to Example 1 except that the mixing ratio of $LiCB_9H_{10}$ to $LiCB_{11}H_{12}$ by molar ratio was changed to $LiCB_9H_{10}$:$LiCB_{11}H_{12}$=5:5. As can be seen from the result of X-ray diffraction, the obtained ion conductor was the mixed phase of $LiCB_9H_{10}$ and $LiCB_{11}H_{12}$.

<X-Ray Diffraction Measurement>

For the powder of each of the ion conductors obtained in Examples 1 to 4 and Comparative Example 1, X-ray diffraction measurement (X'pert Pro manufactured by Malvern PANalytical Ltd, CuKα:λ=1.5405 Å) was conducted using a Lindemann glass capillary (outer diameter 0.5 mm, thickness 0.01 mm) under an argon atmosphere at room temperature (25° C.). The obtained X-ray diffraction peaks are shown in FIGS. 1A and 1B. For the purpose of comparison, X-ray diffraction peaks of raw materials $LiCB_9H_{10}$ and $LiCB_{11}H_{12}$ are also shown in FIG. 1A.

In FIGS. 1 to 4, X-ray diffraction peaks were observed at at least 2θ=14.9±0.3 deg, 16.4±0.3 deg and 17.1±0.5 deg. The intensities at peak positions 16.44 deg and 17.07 deg which are the peak positions of the high temperature phase of $LiCB_9H_{10}$ were defined as A and B respectively, and the intensity ratio (B/A) is summarized in Table 1. Each of the intensities was calculated from A=(X-ray diffraction intensity at 16.44 deg)−(X-ray diffraction intensity at 20 deg) and B=(X-ray diffraction intensity at 17.07 deg)−(X-ray diffraction intensity at 20 deg) by regarding the value at 2θ=20 deg as a baseline.

In each of Examples 1 to 4, from the fact that the peak positions coincide with the peak positions of the high temperature phase of $LiCB_9H_{10}$, it can be seen that a solid solution was obtained, but on the other hand, in Comparative Example 1, it can be seen that a mixed phase of the low temperature phase of $LiCB_9H_{10}$ and $LiCB_{11}H_{12}$ was obtained, and that the Comparative Example 1 was outside the region of solid solution.

TABLE 1

Intensity ratio in Examples and Comparative Example

| | Example 1 | Example 2 | Example 3 | Example 4 | Comparative Example 1 |
|---|---|---|---|---|---|
| $LiCB_9H_{10}$:$LiCB_{11}H_{12}$ | 9:1 | 8:2 | 7:3 | 6:4 | 5:5 |
| Intensity ratio (B/A) | 8.6 | 4.7 | 2.6 | 1.6 | 0.93 |

<Raman Spectroscopy>

(1) Sample Preparation

A measurement sample was prepared using a sealable container having quartz glass (ϕ 60 mm, thickness 1 mm) as an optical window on the top. In a glove box under an argon atmosphere, the sample was retained in contact with quartz glass, then the container was sealed and removed outside the glove box, and Raman spectroscopy was conducted.

(2) Measurement Conditions

Measurements were conducted using a laser Raman spectrometer NRS-5100 (manufactured by JASCO Corporation) at an excitation wavelength of 532.15 nm and an exposure time of 5 seconds. The obtained Raman spectra are shown in FIG. 2.

$LiCB_9H_{10}$ has a peak at 749 $cm^{-1}$, and $LiCB_{11}H_{12}$ has a peak at 763 $cm^{-1}$. The Raman shift value is derived from bonding and is hardly influenced by the state of crystal. In Examples 1 to 2, the peak at 763 $cm^{-1}$ is a shoulder peak of 749 $cm^{-1}$, and in Examples 3 to 4 and Comparative Example 1, the peak at 749 $cm^{-1}$ is a shoulder peak of 763 $cm^{-1}$, but in any case, it can be seen that both $LiCB_9H_{10}$ and $LiCB_{11}H_{12}$ exist.

<Ion Conductivity Measurement>

In a glove box under an argon atmosphere, each of the ion conductor obtained in Examples 1 to 4 and Comparative Example 1, raw materials $LiCB_9H_{10}$ and $LiCB_{11}H_{12}$ were subjected to uniaxial molding (240 MPa) to manufacture a disk having a thickness of about 1 mm and ϕ 8 mm. The temperature was increased and decreased within the temperature range from room temperature to 150° C. or 80° C. at interval of 10° C., and AC impedance measurement (HIOKI 3532-80, chemical impedance meter) by two-terminal method using a lithium electrode was conducted to calculate the ion conductivity. The range of the measurement frequency was 4 Hz to 1 MHz, and the amplitude was 100 mV.

The measurement result of the respective ion conductivity is shown in FIG. 3. The ion conductivity at room temperature (25° C.) is shown in Table 2. In any of Examples 1 to 4 and Comparative Example 1, the phenomenon of rapid reduction in ion conductivity at a low temperature was not observed, which was observed in raw materials $LiCB_9H_{10}$ and $LiCB_{11}H_{12}$. However, there is a large difference in the ion conductivity between Comparative Example 1 and Examples 1 to 4, and it can be seen that even in Example 4 having the lowest ion conductivity among Examples 1 to 4, the ion conductivity at room temperature is enhanced by two times compared to Comparative Example 1.

TABLE 2

| | Example 1 | Example 2 | Example 3 | Example 4 | Comparative Example 1 |
|---|---|---|---|---|---|
| Ion conductivity at 25° C. | | | | | |
| $LiCB_9H_{10}:LiCB_{11}H_{12}$ | 9:1 | 8:2 | 7:3 | 6:4 | 5:5 |
| Ion conductivity/$mScm^{-1}$ | 2.3 | 2.2 | 1.4 | 1.0 | 0.49 |

Example 5

<Dissolution/Precipitation Test Using Lithium Symmetric Cell>

The powder of the ion conductor obtained in Example 3 was put in a powder tableting machine having a diameter of 8 mm, and press-molded into the shape of a disk at a pressure of 143 MPa to obtain a disk-shaped pellet having a laminated solid electrolyte layer (300 μm). Metallic lithium foils (manufactured by Honjo Metal Co., Ltd.) having a thickness of 200 μm and ϕ 8 mm were stuck on both sides of this pellet, and the pellet was placed in a locked test cell made of SUS 304 for an all-solid battery (manufactured by Hosen Corp.) and the cell was closed tightly and used as an evaluation cell. All the above operations were conducted in a glove box under an argon atmosphere. The voltage applied between the electrodes of the manufactured evaluation cell was measured by repeating the cycle (each cycle is 1 hour) of sending a current while inverting polarity every 0.5 hours at a measurement temperature of 25° C. and current density of 0.2 mA/cm-2 using a potentiostat/galvanostat (VMP3 manufactured by Bio-Logic Science Instruments Ltd). The result is shown in FIG. 4. The overvoltage was as low as less than 0.01 V and flat, and did not show an abnormal voltage. The increase in overvoltage after 100 cycles was only a slight increase, and thus it was shown that dissolution/precipitation of Li was repeated successfully.

Example 6

<Charge/Discharge Test>
(Preparation of Positive Electrode Active Material)

Sulfur (S) (manufactured by Sigma-Aldrich Co. LLC., purity 99.98%), Ketjen black (EC600JD manufactured by LION SPECIALTY CHEMICALS CO., LTD.) and Maxsorb (R) (MSC30 manufactured by Kansai Coke and Chemicals Company, Limited) were placed in a 45 mL pot made of SUJ-2 so that the weight ratio of S:Ketjen black:Maxsorb (R)=50:25:25 was obtained. In addition, balls made of SUJ-2 (q 7 mm, 20 balls) were placed, and the pot was completely sealed. This pot was attached to a planetary ball mill (P7 manufactured by FRITSCH GmbH), and mechanical milling was conducted at a rotation number of 400 rpm for 20 hours to obtain a S-carbon composite positive electrode active material.
(Preparation of Powder of Positive Electrode Layer)

The powders were weighed in a glove box so that the ratio of the S-carbon composite positive electrode active material prepared above: the ion conductor obtained in Example 3=1:1 (weight ratio) was obtained, and mixed in a mortar to obtain the powder of positive electrode layer.
(Production of all-Solid Battery)

The powder of the ion conductor obtained in Example 3 was put in a powder tableting machine having a diameter of 10 mm, and press-molded into the shape of a disk at a pressure of 143 MPa (formation of the solid electrolyte layer). The powder of the positive electrode layer prepared above was placed in the powder tableting machine without removing the molded product, and subjected to integral molding at a pressure of 285 MPa. Thus, a disk-shaped pellet was obtained in which a positive electrode layer (75 μm) and a solid electrolyte layer (300 μm) were laminated. A metallic lithium foil (manufactured by Honjo Metal Co., Ltd.) having a thickness of 200 μm and ϕ 8 mm was stuck on the side of this pellet opposite to the positive electrode layer to be used as a lithium negative electrode layer, and the pellet was placed in a locked test cell made of SUS 304 (manufactured by Hosen Corp.) for an all-solid battery, and the cell was closed tightly and used as an all-solid secondary battery.
(Charge/Discharge Test)

The charge/discharge test was started from charging for the all-solid secondary battery produced as described above at a measurement temperature of 25° C., a cut-off voltage of 1.0 to 2.5 V and a constant current of C-rate of 0.1 C, using a potentiostat/galvanostat (VMP3 manufactured by Bio-Logic Science Instruments Ltd). The discharge capacity was shown as a value of discharge capacity obtained for the tested battery per g of sulfur-based electrode active material. The coulomb efficiency was calculated from coulomb efficiency=charge capacity/discharge capacity. The results were shown in FIG. 5.

Though a large irreversible capacity was observed in the first time of discharge, 98% or more of coulomb efficiency was shown in the second time or later. Regarding the cycle characteristics, while the discharge capacity was 1900 mAh/g in the first time, it decreased significantly to 1300 mAh/g in the second cycle, but it was stabilized in the third time or later and the discharge capacity was 1100 mAh/g in the 20th time, and thus a large delivered capacity was able to be obtained.

The invention claimed is:

1. A method for manufacturing an ion conductor comprising $LiCB_9H_{10}$ and $LiCB_{11}H_{12}$, comprising:
   mixing $LiCB_9H_{10}$ and $LiCB_{11}H_{12}$ in a molar ratio of $LiCB_9H_{10}/LiCB_{11}H_{12}$=1.1 to 20.

2. The method for manufacturing an ion conductor according to claim 1, wherein the mixing is conducted by mechanical milling treatment.

3. The method for manufacturing an ion conductor according to claim 2, wherein a period of time for conducting the mechanical milling treatment is 1 to 48 hours.

4. The method for manufacturing an ion conductor according to claim 1, wherein the obtained ion conductor has X-ray diffraction peaks at at least 2θ=14.9±0.3 deg, 16.4±0.3 deg and 17.1±0.5 deg in X ray diffraction measurement at 25° C., and has an intensity ratio (B/A) of 1.0 to 20 as calculated from A=(X-ray diffraction intensity at 16.4±0.3 deg)–(X-ray diffraction intensity at 20 deg) and B=(X-ray diffraction intensity at 17.1±0.5 deg)–(X-ray diffraction intensity at 20 deg).

5. An ion conductor comprising lithium (Li), carbon (C), boron (B) and hydrogen (H),
   wherein the ion conductor comprises $LiCB_9H_{10}$ and $LiCB_{11}H_{12}$ in a molar ratio of $LiCB_9H_{10}/LiCB_{11}H_{12}$=1.1 to 20,
   wherein the ion conductor has X-ray diffraction peaks at at least 2θ=14.9±0.3 deg, 16.4±0.3 deg and 17.1±0.5 deg in X ray diffraction measurement at 25° C., and has an intensity ratio (B/A) of 1.0 to 20 as calculated from A=(X-ray diffraction intensity at 16.4±0.3 deg)–(X-ray diffraction intensity at 20 deg) and B=(X-ray diffraction intensity at 17.1±0.5 deg)–(X-ray diffraction intensity at 20 deg).

6. The ion conductor according to claim 5, wherein the ion conductor has peaks at 749 cm$^{-1}$ (+5 cm$^{-1}$) and 763 cm$^{-1}$ (+5 cm$^{-1}$) respectively in Raman spectroscopy.

7. The ion conductor according to claim 5, wherein the ion conductor has an ion conductivity of 1.0 to 10 mScm$^{-1}$ at 25° C.

8. A solid electrolyte for an all-solid battery comprising the ion conductor according to claim 5.

9. An electrode formed by contacting the solid electrolyte according to claim 8 with metallic lithium.

10. An all-solid battery comprising the electrode according to claim 9.

* * * * *